(12) United States Patent
Iwasaki

(10) Patent No.: US 8,508,584 B2
(45) Date of Patent: Aug. 13, 2013

(54) IMAGE PICKUP APPARATUS, ZOOM CORRECTION INFORMATION CREATION METHOD AND PROGRAM, AND RECORDING MEDIUM

(75) Inventor: Hiroyuki Iwasaki, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 393 days.

(21) Appl. No.: 12/827,708

(22) Filed: Jun. 30, 2010

(65) Prior Publication Data

US 2011/0001847 A1 Jan. 6, 2011

(30) Foreign Application Priority Data

Jul. 1, 2009 (JP) ................................. 2009-156863

(51) Int. Cl.
*H04N 13/02* (2006.01)
*H04N 17/00* (2006.01)
*H04N 17/02* (2006.01)

(52) U.S. Cl.
USPC ........................................... 348/49; 348/188

(58) Field of Classification Search
USPC .......................................................... 348/49
See application file for complete search history.

(56) References Cited

U.S. PATENT DOCUMENTS

| 4,999,713 | A | 3/1991 | Ueno et al. | |
| 7,728,875 | B2 * | 6/2010 | Suzuki et al. | 348/211.11 |
| 2005/0134709 | A1 * | 6/2005 | Ishii et al. | 348/240.99 |

FOREIGN PATENT DOCUMENTS

| JP | 01225936 A | 9/1989 |
| JP | 5-130646 A | 5/1993 |
| JP | 07087385 A | 3/1995 |
| JP | 7-111610 A | 4/1995 |
| JP | 10-307352 A | 11/1998 |
| JP | 2001-124991 A | 5/2001 |
| JP | 2002-116366 A | 4/2002 |
| JP | 2003-324113 A | 11/2003 |
| JP | 2006-162991 A | 6/2006 |
| JP | 2008-003501 A | 1/2008 |

OTHER PUBLICATIONS

Notification of Reasons for Rejection, dated Jun. 24, 2013, issued in corresponding JP Application No. 2009-156863, 4 pages in English and Japanese.

* cited by examiner

*Primary Examiner* — Albert Cutler
(74) *Attorney, Agent, or Firm* — Sughrue Mion, PLLC

(57) ABSTRACT

According to the apparatus, the method, the program, and the recording medium of the present invention, the amount of feed of a first zoom lens and the amount of feed of a second zoom lens corresponding to a magnification of the first zoom lens and a magnification of the second zoom lens which are close to each other are associated, and the amounts of feed of the first zoom lens and the second zoom lens corresponding to an arbitrarily designated magnification are set. Accordingly, the magnifications of the first zoom lens and the second zoom lens can be accurately made almost equal over the entire zoom range. Since the magnifications of the first zoom lens and the second zoom lens are made equal on the basis of the amounts of feed, effective pixels do not decrease, unlike magnification correction using an electronic zoom.

10 Claims, 10 Drawing Sheets

FIG.7

(a) FIRST LENS

| Z_pulse | MAGNIFICATION |
|---|---|
| 0 | 0.9580 |
| 1 | 0.9627 |
| 2 | 0.9674 |
| 3 | 0.9723 |
| 4 | 0.9774 |
| 5 | 0.9825 |
| 6 | 0.9878 |
| 7 | 0.9931 |
| 8 | 1.0000 |
| 9 | 1.0043 |
| 10 | 1.0100 |
| 11 | 1.0168 |
| . | |
| . | |
| . | |
| . | |
| . | |
| . | |
| . | |
| 173 | 3.8091 |
| 174 | 3.8358 |
| 175 | 3.8625 |
| 176 | 3.8894 |
| 177 | 3.9163 |
| 178 | 3.9434 |
| 179 | 3.9707 |
| 180 | 3.9980 |
| 181 | 4.0255 |
| 182 | 4.0530 |
| 183 | 4.0807 |
| 184 | 4.1086 |
| 185 | 4.1365 |

WIDE(Z1) at row 8; TELE(Zn) at row 180; I1

(b) SECOND LENS

| Z_pulse | MAGNIFICATION |
|---|---|
| 0 | 0.9662 |
| 1 | 0.9710 |
| 2 | 0.9760 |
| 3 | 0.9810 |
| 4 | 0.9862 |
| 5 | 0.9916 |
| 6 | 0.9980 |
| 7 | 1.0026 |
| 8 | 1.0050 |
| 9 | 1.0141 |
| 10 | 1.0200 |
| 11 | 1.0261 |
| . | |
| . | |
| . | |
| . | |
| . | |
| . | |
| . | |
| 173 | 3.9136 |
| 174 | 3.9411 |
| 175 | 3.9520 |
| 176 | 3.9821 |
| 177 | 4.0056 |
| 178 | 4.0356 |
| 179 | 4.0805 |
| 180 | 4.1088 |
| 181 | 4.1372 |
| 182 | 4.1657 |
| 183 | 4.1943 |
| 184 | 4.2231 |
| 185 | 4.2520 |

I2

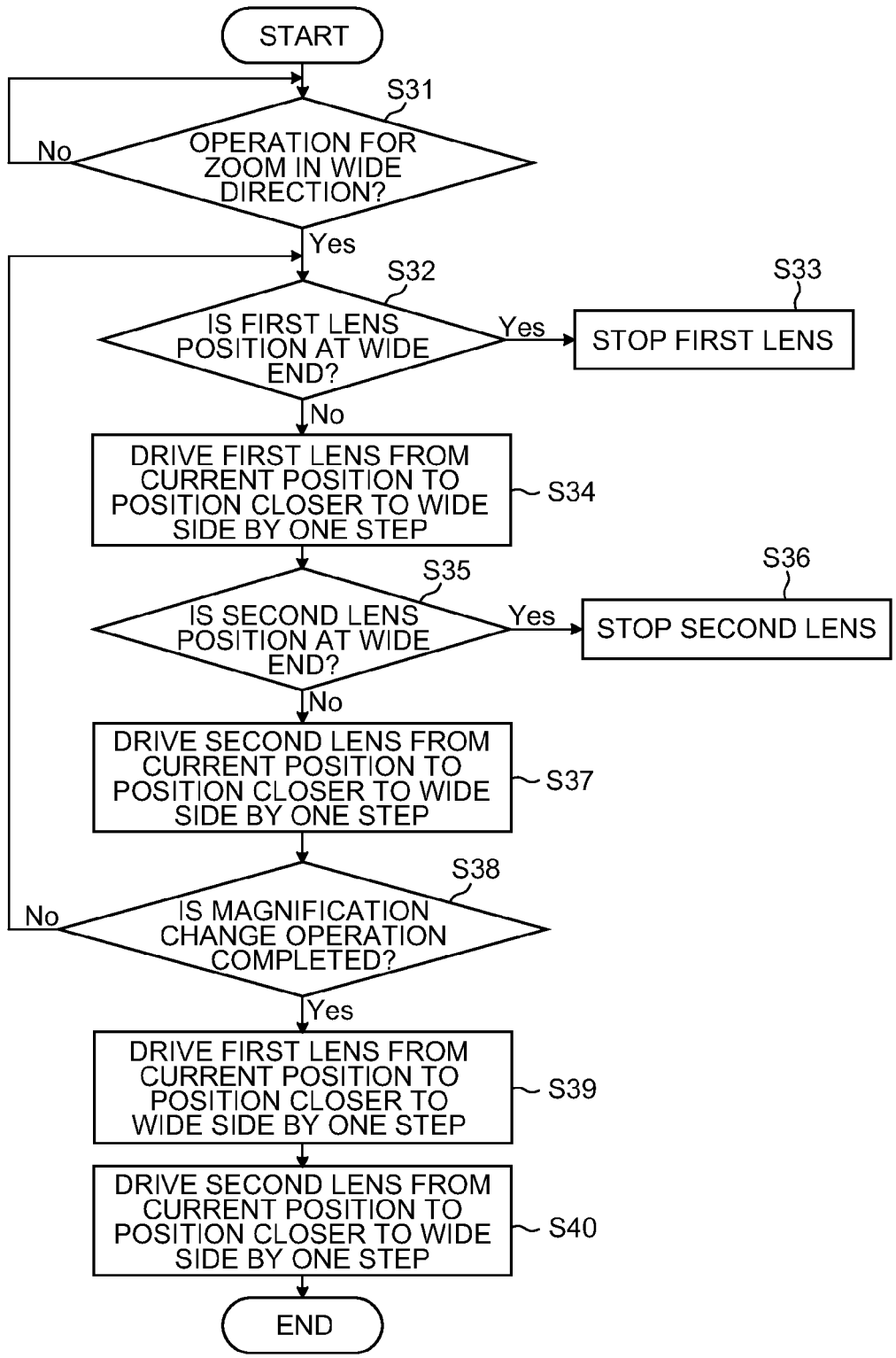

IMAGE PICKUP APPARATUS, ZOOM CORRECTION INFORMATION CREATION METHOD AND PROGRAM, AND RECORDING MEDIUM

BACKGROUND OF THE INVENTION

1. Field of the Invention

The present invention relates to an image pickup apparatus including a plurality of optical systems and, more particularly, to rectification of a discrepancy in zoom factor among the optical systems.

2. Description of the Related Art

Various techniques have been developed for rectifying an error between two variable magnification imaging lenses.

In Japanese Patent Application Laid-Open No. 5-130646, the position of an image pickup apparatus is detected, and misalignment correction control is performed with reference to image pickup condition correction data such that image pickup conditions are optimized.

In Japanese Patent Application Laid-Open No. 7-111610, drive control is performed based on outputs from zoom encoders such that the magnifications of left and right lenses are always equal.

In Japanese Patent Application Laid-Open No. 2006-162991, a magnification error between left and right lenses is stored for each of predetermined positions, and the magnifications are controlled by an electronic zoom to be constant.

In Japanese Patent Application Laid-Open No. 10-307352, a pair of pieces of image data is geometrically transformed, and discrepancies such as a horizontal discrepancy, a vertical discrepancy, a rotational discrepancy, and a discrepancy in magnification are adjusted by the image transformation. The amounts of discrepancy are used in an affine transformation.

Japanese Patent Application Laid-Open No. 2001-124991 discloses a stereoscopic image pickup apparatus which uses one image pickup element and causes reflection and separation by front lens groups. A lens group closest to a subject of rear lens groups is used for focusing. Variable magnification lenses are located closer to the image pickup element than the lens group. The stereoscopic image pickup apparatus has lens groups for compensating for a tracking lens shift caused by a change of magnification.

Other conventional techniques related to the present application include Japanese Patent Application Laid-Open Nos. 2003-324113, 2008-3501, and 2002-116366.

SUMMARY OF THE INVENTION

In Japanese Patent Application Laid-Open No. 5-130646, a discrepancy in angle of view between two lenses caused by a manufacturing error is not rectified. In Japanese Patent Application Laid-Open No. 7-111610, zoom drive positions are determined from output signals from the encoders, and the lenses are driven such that the magnifications are kept constant. However, a discrepancy in magnification between two lenses caused by a manufacturing error is not rectified. In Japanese Patent Application Laid-Open No. 2006-162991, a correction amount for a magnification error is stored in advance for each of the predetermined positions, and the magnifications are controlled by an electronic zoom to be constant. Accordingly, effective pixels of one of imaging apparatuses decrease, and a discrepancy in magnification between adjacent ones of the predetermined positions cannot be appropriately rectified. In Japanese Patent Application Laid-Open No. 10-307352, the process of adjusting optical discrepancies by transforming image coordinates is adopted. The process decreases effective pixels. Japanese Patent Application Laid-Open No. 10-307352 makes no disclosure regarding a discrepancy in magnification at the time of a change of magnification. In Japanese Patent Application Laid-Open No. 2001-124991, since two lenses share a variable magnification system, no magnification change error occurs between the two lenses.

The present invention has as its object to accurately rectify a discrepancy in magnification between different optical systems and ensure the maximum number of effective pixels, over the entire zoom range.

To achieve the above object, a first aspect of the present invention provides an image pickup apparatus comprising an image pickup section that photoelectrically converts, by an image pickup element, subject images formed through a plurality of image pickup optical systems including a first optical system and a second optical system and outputs a plurality of images corresponding to the image pickup optical systems, a first lens drive section that drives a first zoom lens included in the first optical system, a second lens drive section that drives a second zoom lens included in the second optical system, a control section that controls stepwise driving of the first lens drive section and the second lens drive section, a first counter that counts an amount of stepwise feed of the first zoom lens by the first lens drive section with respect to a predetermined reference position as a start point in accordance with control by the control section, a second counter that counts an amount of stepwise feed of the second zoom lens by the second lens drive section with respect to a predetermined reference position as a start point in accordance with control by the control section, a calculation section that calculates a magnification of the first zoom lens corresponding to the amount of stepwise feed counted by the first counter and a magnification of the second zoom lens corresponding to the amount of stepwise feed counted by the second counter, and a zoom correction information creation section that creates zoom correction information in which the amount of stepwise feed of the first zoom lens and the amount of stepwise feed of the second zoom lens corresponding to one of a plurality of magnifications of the first zoom lens and one of a plurality of magnifications of the second zoom lens close to each other are associated and records the zoom correction information on a predetermined storage medium.

In the first aspect, it is preferable that the first lens drive section and the second lens drive section each comprise a DC motor, the apparatus further comprises a first encoder which outputs a pulse corresponding to an amount of rotation of the DC motor of the first lens drive section and a second encoder which outputs a pulse corresponding to an amount of rotation of the DC motor of the second lens drive section, the first counter counts, as the amount of feed, the number of pulses outputted by the first encoder to correspond to stepwise driving of the first zoom lens by the first lens drive section, and the second counter counts, as the amount of feed, the number of pulses outputted by the second encoder in response to stepwise driving of the second zoom lens by the second lens drive section.

In the first aspect, it is preferable that the first lens drive section and the second lens drive section each comprise a stepping motor, the first counter counts, as the amount of feed, the number of drive pulses from the control section to the first lens drive section corresponding to stepwise driving of the first zoom lens by the first lens drive section, and the second counter counts, as the amount of feed, the number of drive pulses from the control section to the second lens drive section corresponding to stepwise driving of the second zoom lens by the second lens drive section.

In the first aspect, it is preferable that the control section controls the image pickup section to output a first image corresponding to the first optical system and a second image corresponding to the second optical system which are subject images of a predetermined line segment chart each time the control section controls stepwise driving of the first lens drive section and the second lens drive section, and the calculation section calculates a magnification of the first zoom lens on the basis of a first length which is a pixel pitch corresponding to a length of the predetermined line segment chart and a reference pitch which is a pixel pitch corresponding to a length of the predetermined line segment chart when the first zoom lens is located at a predetermined 1× magnification position, from the first image outputted from the image pickup section, and calculates a magnification of the second zoom lens on the basis of a second length which is a pixel pitch corresponding to a length of the predetermined line segment chart and the reference pitch, from the second image.

In the first aspect, it is preferable that the apparatus further comprises a designation section which designates a zoom factor, the control section identifies a first amount of feed which is the amount of stepwise feed of the first zoom lens and a second amount of feed which is the amount of stepwise feed of the second zoom lens corresponding to the zoom factor designated by the designation section from the zoom correction information and controls the first lens drive section to drive the first zoom lens by the first amount of feed and the second lens drive section to drive the second zoom lens by the second amount of feed.

In the above aspect, it is preferable that the zoom correction information creation section calculates a difference between the amount of stepwise feed of the first zoom lens and the amount of stepwise feed of the second zoom lens corresponding to each magnification in the zoom correction information and creates differential zoom correction information in which the amount of stepwise feed of the first zoom lens corresponding to each magnification and the difference are associated, and the control section identifies the first amount of feed as the amount of stepwise feed of the first zoom lens and the difference corresponding to the zoom factor designated by the designation section from the differential zoom correction information and controls the first lens drive section to drive the first zoom lens by the first amount of feed and the second lens drive section to drive the second zoom lens by an amount in which the difference is subtracted from the first amount of feed.

A second aspect of the present invention provides a zoom correction information creation method for an image pickup apparatus having an image pickup section that photoelectrically converts, by an image pickup element, subject images formed through a plurality of image pickup optical systems including a first optical system and a second optical system and outputs a plurality of images corresponding to the image pickup optical systems, a first lens drive section that drives a first zoom lens included in the first optical system, a second lens drive section that drives a second zoom lens included in the second optical system, and a control section that controls stepwise driving of the first lens drive section and the second lens drive section, the method comprising the steps of counting an amount of stepwise feed of the first zoom lens by the first lens drive section with respect to a predetermined reference position as a start point in accordance with control by the control section, counting an amount of stepwise feed of the second zoom lens by the second lens drive section with respect to a predetermined reference position as a start point in accordance with control by the control section, calculating a magnification of the first zoom lens corresponding to the counted amount of stepwise feed of the first zoom lens and a magnification of the second zoom lens corresponding to the counted amount of stepwise feed of the second zoom lens, and creating zoom correction information in which the amount of stepwise feed of the first zoom lens and the amount of stepwise feed of the second zoom lens corresponding to one of a plurality of the magnification of the first zoom lens and one of a plurality of the magnification of the second zoom lens close to each other are associated and recording the zoom correction information on a predetermined storage medium.

A program for causing an image pickup apparatus to perform the method is also included in the present invention as a third aspect.

A recording medium in which computer readable code of the program according to the third aspect is stored is also included in the present invention as a fourth aspect. The recording medium includes magnet/optical recording medium like CDs (compact disks), DVD disks, HDDs (hard disk drives) and semiconductor memories like EEPROM or flash memory.

According to the present invention, the amount of feed of a first zoom lens and the amount of feed of a second zoom lens corresponding to a magnification of the first zoom lens and a magnification of the second zoom lens which are close to each other are associated, and the amounts of feed of the first zoom lens and the second zoom lens corresponding to an arbitrarily designated magnification are set. Accordingly, the magnifications of the first zoom lens and the second zoom lens can be accurately made almost equal over the entire zoom range. Since the magnifications of the first zoom lens and the second zoom lens are made equal on the basis of the amounts of feed, effective pixels do not decrease, unlike magnification correction using an electronic zoom.

BRIEF DESCRIPTION OF THE DRAWINGS

FIG. 7 is a chart showing an example of a piece of zoom factor information;
FIG. 10 is a flow chart of a pulse position adjustment process when the first variable magnification lens and the second variable magnification lens move in the WIDE direction.

DETAILED DESCRIPTION OF THE PREFERRED EMBODIMENTS

First Embodiment

Figure 1:
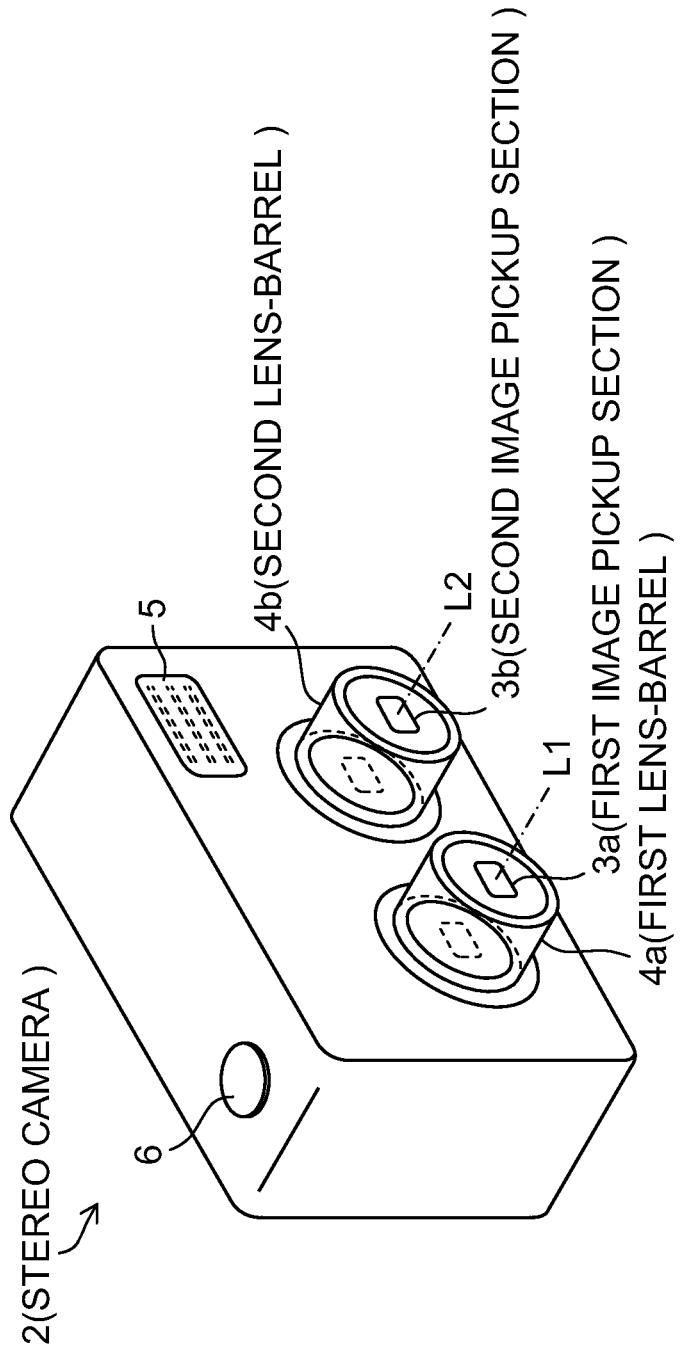
FIG. 1 is a perspective front view of a stereo camera.

Referring to FIG. 1, a first lens-barrel 4a holding a first image pickup section 3a and a second lens-barrel 4b holding a second image pickup section 3b are incorporated in a front surface of a stereo camera 2. A strobe device 5 and the like are also exposed at the front surface. The first and second lens-barrels 4a and 4b are spaced horizontally adjacent to each other. The first and second lens-barrels 4a and 4b extend forward from a camera main body in imaging mode, as indicated by solid lines in FIG. 1, and collapse into the camera main body when the power to the stereo camera 2 is OFF or in image reproduction mode, as indicated by dotted lines in FIG. 1. A shutter button 6 used for shutter release operation is provided at an upper surface of the stereo camera 2.

Figure 2:
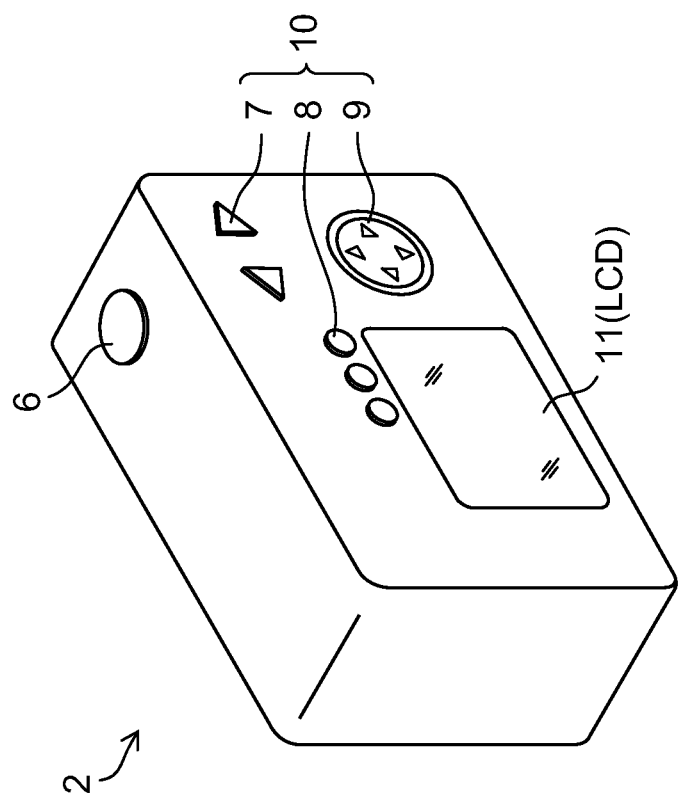
FIG. 2 is a perspective rear view of the stereo camera.

Referring to FIG. 2, an operation section 10 which has zoom buttons 7, a menu button 8, a cursor button 9, and the like and an LCD (Liquid Crystal Display) 11 are provided at a back surface of the stereo camera 2. Turning on/off of the power, switching among various modes (e.g., imaging mode and reproduction mode), zooming, or the like is performed by appropriate operation of the operation section 10. The LCD 11 is a parallax barrier type (or lenticular lens type) 3D monitor. The LCD 11 functions as an electronic viewfinder at the time of taking an image and functions as an image reproduction monitor at the time of reproducing an image.

Figure 3:
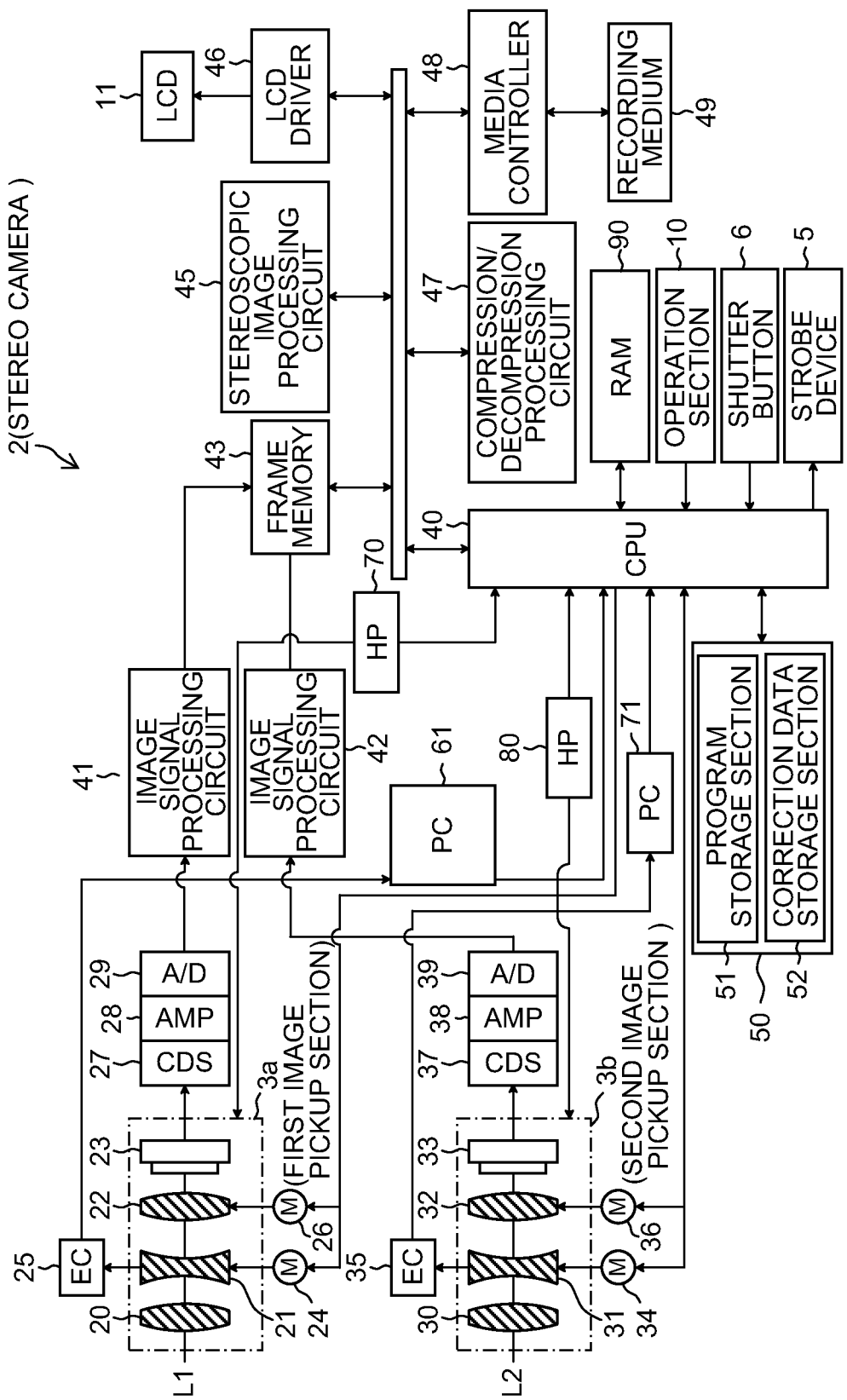
FIG. 3 is a block diagram of the stereo camera.

FIG. 3 shows the electrical configuration of the stereo camera 2. The first image pickup section 3a has a first fixed lens 20, a first variable magnification lens 21, a first focus lens 22, and a first image sensor 23, all of which are arranged along a lens optical axis L1. The first fixed lens 20 is fixedly provided in the first lens-barrel 4a. The first variable magnification lens 21 is driven by a lens motor 24 which has a DC motor. The first focus lens 22 is driven by a lens motor 26. The operation of the lens motors 24 and 26 are controlled by a CPU 40.

Home position detection sections (HP) 70 and 80 each detect that a corresponding one of the first variable magnification lens 21 and a second variable magnification lens 31 is located at a home position (reference position) and output a detection result to the CPU 40. For example, in a camera with a two-group type zoom device, a position of a rear group of lenses closest to the position of a front group of lenses is set as a home position.

The lens motor 24 moves the first variable magnification lens 21 along the lens optical axis L1 from the home position as a start point to the TELE side/WIDE side (extended side/collapsed side) in response to operation of the zoom buttons 7 (a ring-shaped operation member may be used instead of the buttons) of the operation section 10 to enter information on a TELE or WIDE zoom direction and changes a focal distance (imaging magnification). If the first variable magnification lens 21 is moved to the TELE side, the focal distance becomes longer, and an imaging range becomes narrower. On the other hand, if the first variable magnification lens 21 is moved to the WIDE side, the focal distance becomes shorter, and the imaging range becomes wider. The lens motor 26 moves the first focus lens 22 along the lens optical axis L1 and performs focusing. The position of the first focus lens 22 is automatically adjusted in keeping with movement of the first variable magnification lens 21 so as to prevent defocusing. Assume that stepwisely-increasing zoom factors (zoom steps Z1, Z2, . . . , Zn) can be entered through the operation section 10. A number n of steps is arbitrary. The zoom step Z1 corresponds to the WIDE end whereas the zoom step Zn corresponds to the TELE end.

A known encoder as in Japanese Patent Application Laid-Open No. 2008-3501 is attached to the lens motor 24. Although the details are omitted in FIG. 3, an encoder 25 has a pulse disc which is fixed to a main shaft of the lens motor 24 and has a large number of slits formed therein, a light-emitting diode which is arranged at the back surface of the pulse disc, a photosensor which is arranged to face the light-emitting diode across the slits, a pulse generation section which A/D-converts a detection signal from the photosensor and generates a pulse, and a first pulse counter 61 which is capable of counting the number of pulses generated by the pulse generation section and calculating a rotational speed, the number of rotations, and the like.

When the lens motor 24 is driven, the main shaft and the pulse disc are rotated. If the light-emitting diode is made to emit light at the same time, the photosensor receives a light beam from the light-emitting diode having passed through the slits, photoelectrically converts the light beam, and outputs an electric signal. The pulse generation section A/D-converts the electric signal outputted from the photosensor and outputs a pulse. Since the slits are formed in the pulse disc at regular intervals, the pulse generation section generates a pulse at high level only when the photosensor receives a light beam. The number of pulses counted by the first pulse counter 61 is outputted to the CPU 40.

A target zoom direction set through the zoom buttons 7 is outputted to the CPU 40. The CPU 40 sets a target zoom position according to the target zoom direction. The CPU 40 sets, as the target zoom position, one closest to the current position of the first variable magnification lens 21 of zoom steps on the TELE side if the target zoom direction is the TELE direction and sets, as the target zoom position, one closest to the current position of the first variable magnification lens 21 of zoom steps on the WIDE side if the target zoom direction is the WIDE direction. The CPU 40 converts the target zoom position into the number of pulses needed for the first variable magnification lens 21 to reach a target stop position. Note that a pulse count of 0 corresponds to the home position detected by the home position detection section 70.

A focal distance based on a pulse count is stored in an EEPROM 50. The CPU 40 calculates a current focal distance (zoom position) on the basis of a pulse count from the first pulse counter 61 (or a second pulse counter 71) and displays a result of the calculation on the LCD 11. The CPU 40 drives the lens motor 24 such that a pulse count from the first pulse counter 61 corresponds to a first target stop position. How to determine the first target stop position will be described later.

The first image sensor 23 receives a light beam formed by the first fixed lens 20, the first variable magnification lens 21, and the first focus lens 22 and stores photocharge corresponding to the amount of received light in light-receiving elements. Photocharge storage and transfer operation of the first image sensor 23 is controlled by a timing signal (clock pulse) inputted from a timing generator (not shown). In imaging mode, the first image sensor 23 acquires image signals for one frame at predetermined intervals and sequentially inputs image signals to a correlated double sampling circuit (CDS) 27. Note that a CCD or MOS solid-state image pickup apparatus is used as the first image sensor 23.

The correlated double sampling circuit (CDS) 27 receives picked-up image signals for one frame inputted from the first image sensor 23 and inputs pieces of R, G, and B image data accurately corresponding to the amounts of charge stored in the light-receiving elements to an amplifier (AMP) 28. The AMP 28 amplifies the inputted pieces of image data and inputs them to an A/D converter 29. The A/D converter 29 converts the inputted pieces of image data from analog format into digital format. Picked-up image signals from the first image sensor 23 are converted into a piece of first image data (right eye image data) through the CDS 27, the AMP 28, and the A/D converter 29.

The second image pickup section 3b has the same configuration as the first image pickup section 3a and has a second fixed lens 30, the second variable magnification lens 31, which is driven by a lens motor 34, a second focus lens 32 which is driven by a lens motor 36, and a second image sensor 33 which is driven by a timing generator (not shown). The operation of the lens motors 34 and 36 is controlled by the CPU 40. Pulses generated by an encoder 35 which is attached to the lens motor 34 are detected by the second pulse counter (PC) 71 with the same configuration as the first pulse counter 61, and the number of pulses is inputted to the CPU 40. The CPU 40 drives the lens motor 34 such that the pulse count from the second pulse counter 71 corresponds to a second target stop position with respect to the home position serving as a start point detected by the home position detection section 80. Note that a pulse count of 0 corresponds to the home position detected by the home position detection section 80. How to determine the second target stop position will be described later.

Note that the material for each member of the first image pickup section 3a is also used as the material for the corresponding member of the second image pickup section 3b. The first image pickup section 3a and the second image pickup section 3b are synchronized and perform the same operation in conjunction with each other.

A CDS 37, an AMP 38, and an A/D converter 39 have the same configurations as the CDS 27, the AMP 28, and the A/D converter 29 described above, respectively. Picked-up image signals from the second image sensor 33 are converted into a piece of second image data (left eye image data) through the CDS 37, the AMP 38, and the A/D converter 39.

The pieces of first and second image data outputted from the A/D converters 29 and 39 are inputted to image signal processing circuits 41 and 42, respectively. The image signal processing circuits 41 and 42 subject the pieces of image data to various types of image processing such as gradation conversion, white balance correction, and γ correction processing. The piece of first image data outputted from the image signal processing circuit 41 is inputted to a frame memory 43. The piece of second image data outputted from the image signal processing circuit 42 is inputted to the frame memory 43 through an electronic magnification change circuit 44. The frame memory 43 is a working memory for temporarily storing the pieces of first and second image data.

A stereoscopic image processing circuit 45 combines the pieces of first and second image data stored in the frame memory 43 into a piece of stereoscopic image data for stereoscopic display by the LCD 11. An LCD driver 46 causes the LCD 11 to display the piece of stereoscopic image data obtained through the combination by the stereoscopic image processing circuit 45 as a through image when the LCD 11 is used as an electronic viewfinder in imaging mode.

A compression/decompression processing circuit 47 compresses the pieces of first and second image data stored in the frame memory 43 in a compression format such as the JPEG format. A media controller 48 records the pieces of image data compressed by the compression/decompression processing circuit 47 on a recording medium 49 such as a memory card.

When the pieces of first and second image data thus recorded on the recording medium 49 are to be reproduced and displayed on the LCD 11, the pieces of image data recorded on the recording medium 49 are read out by the media controller 48. The pieces of image data having undergone decompression by the compression/decompression processing circuit 47 are converted into a piece of stereoscopic image data by the stereoscopic image processing circuit 45. After that, the piece of stereoscopic image data is reproduced and displayed on the LCD 11 through the LCD driver 46.

Although the detailed structure of the LCD 11 is not shown, the LCD 11 has a parallax barrier display layer at the surface. The LCD 11 generates a parallax barrier with a pattern in which alternate light transmissive and light shielding parts are arranged at a predetermined pitch and displays strip-shaped image fragments representing left and right images which are alternately arranged on an image display surface under the parallax barrier display layer. This configuration can provide an observer with a stereoscopic view.

The CPU 40 controls the overall operation of the stereo camera 2 in a centralized manner. The EEPROM 50 is connected to the CPU 40 in addition to the strobe device 5, the shutter button 6, and the operation section 10 described above. The EEPROM 50 is a nonvolatile memory into which data can be electrically rewritten. The EEPROM 50 includes a program storage section 51 and a correction data storage section 52 and can store any data as long as it has free space.

The program storage section 51 stores a control program for the CPU 40 to perform various types of processing. The correction data storage section 52 stores various pieces of correction data.

Figure 4:
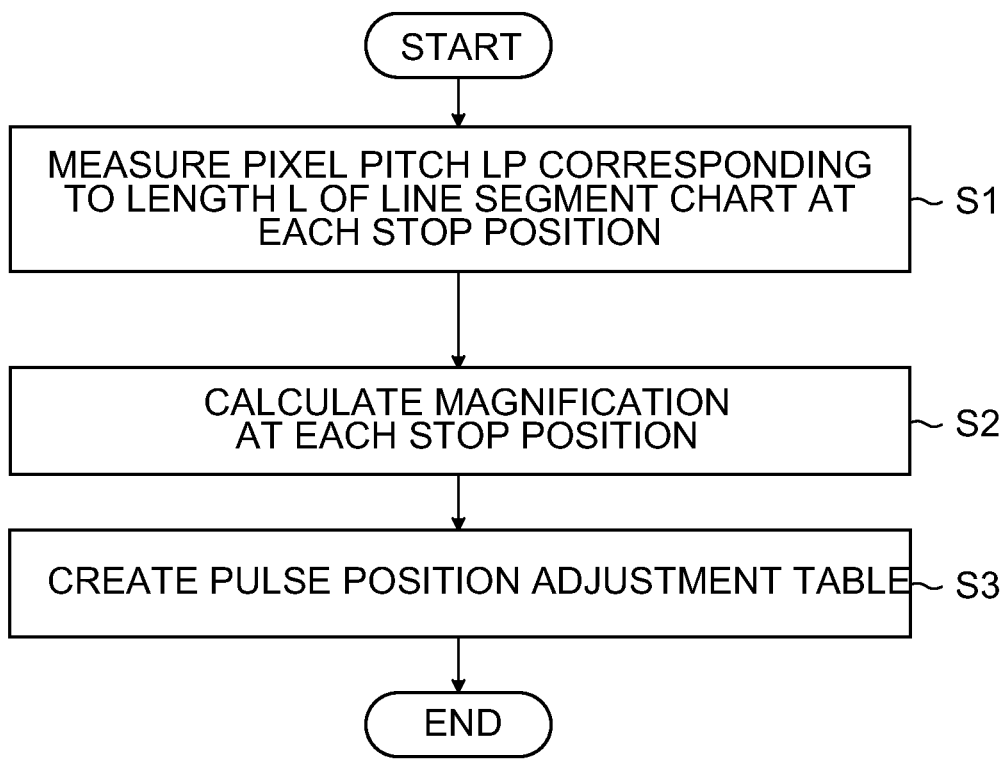
FIG. 4 is a flow chart of a pulse position adjustment table creation process.

The flow of a pulse position adjustment table creation process according to the preferred embodiment of the present embodiment will be described below with reference to the flow chart in FIG. 4. Implementation of the process is controlled by the CPU 40. A program for causing the CPU 40 to perform the process is stored in the program storage section 51. Note that since a personal computer or the like with a hardware configuration equivalent to the CPU 40 can control implementation of the process, the CPU 40 need not necessarily be incorporated in the stereo camera 2. The stereo camera 2 is assumed to be located at a position where it can capture a line segment chart as a subject.

Figure 5:
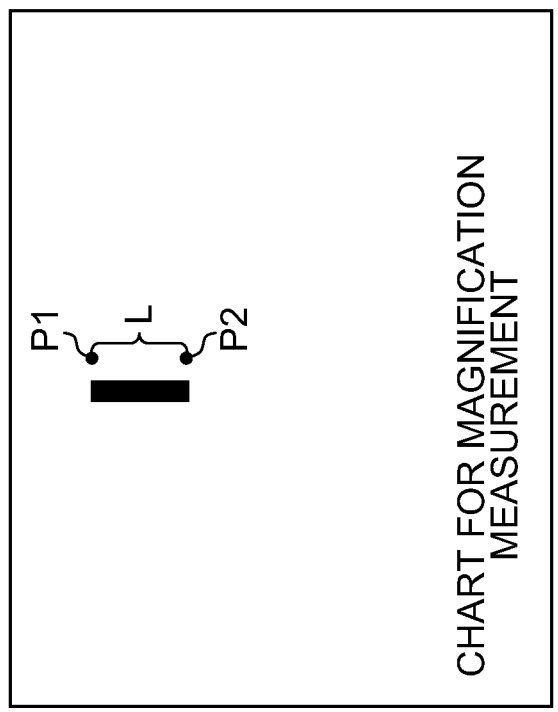
FIG. 5 is a view showing an example of a chart.

In S1, the CPU 40 drives the lens motor 24 such that the first variable magnification lens 21 of the first image pickup section 3a moves to a predetermined drive start position. The predetermined drive start position is stored in the EEPROM 50, and a position after the lens motor 24 is driven from the home position by an amount corresponding to eight pulses is set as the predetermined drive start position. The predetermined drive start position optically corresponds to a position for which 1× magnification is set (the WIDE end). The CPU 40 then images a line segment chart as in FIG. 5 by the first image pickup section 3a. At this time, the CPU 40 calculates a focusing evaluation value from a piece of first image data and brings the line segment chart into focus by known focusing processing such as AF operation for adjusting the lens position of the first focus lens 22 such that the focusing evaluation value reaches its local maximum. The CPU 40 measures a reference pixel pitch LP0 corresponding to a length L of the line segment chart (the distance between two points P1 and P2 arranged in tandem) on the basis of the piece of first image data outputted from the first image pickup section 3a to the frame memory 43. The reference pixel pitch LP0 is stored in a RAM 90.

Figure 6:
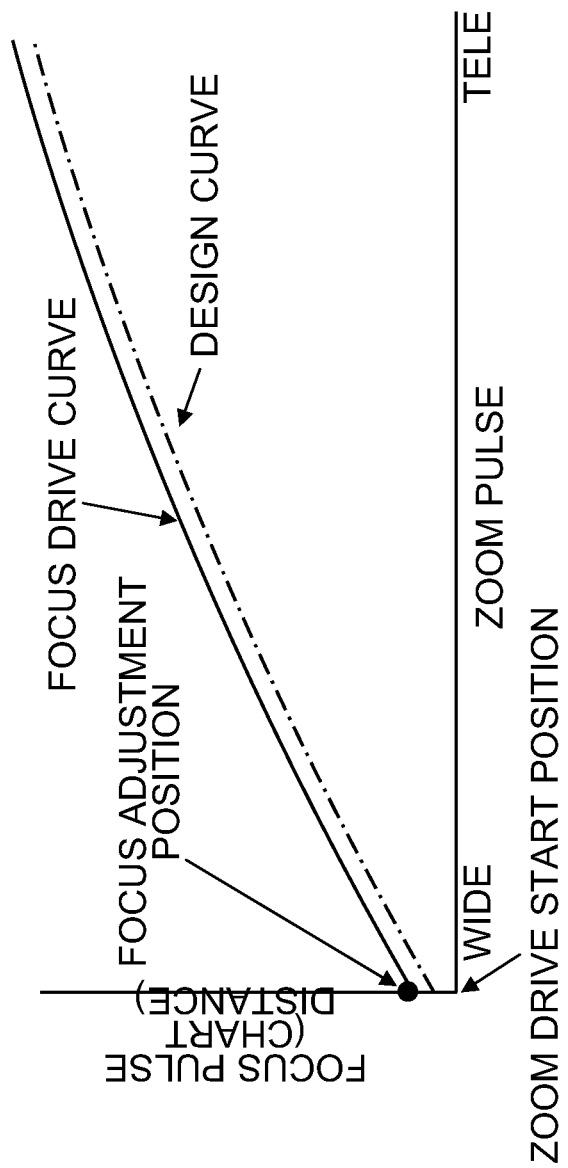
FIG. 6 is a graph showing an example of a tracking curve.

The CPU 40 further drives the lens motor 24 to move the first variable magnification lens 21 of the first image pickup section 3a in a direction from the drive start position toward a drive end position (e.g., the TELE end) by an amount corresponding to one of detected pulses. After each movement corresponding to one pulse, the CPU 40 drives the lens motor 26 to move the first focus lens 22 to the lens position, performs focusing, and images the line segment chart by the first image pickup section 3a. The focusing is performed by determining an adjustment position of the first focus lens 22 corresponding to each position to which the first variable magnification lens 21 is moved using a design curve (tracking curve) as in FIG. 6 and driving the lens motor 26 to move the first focus lens 22 to the determined position, as well known in the art (e.g., Japanese Patent Application Laid-Open No. 2002-116366). The CPU 40 measures a pixel pitch LP-1 corresponding to the length L of the line segment chart on the basis of a piece of first image data obtained from the first image pickup section 3a and associates the pixel pitch LP-1 with the number of pulses detected at the time of the measurement. Similar focusing and imaging are performed for the second image pickup section 3b. After each movement corresponding to one pulse, the CPU 40 measures a pixel pitch LP-2 corresponding to the length L of the line segment chart on the basis of a piece of second image data obtained from the second image pickup section 3b and associates the pixel pitch LP-2 with the number of pulses detected at the time of the measurement. The pixel pitches LP-1 and LP-2 corresponding to the numbers of detected pulses are stored in the RAM 90.

In S2, the CPU 40 calculates a zoom factor corresponding to a detected pulse count for the first variable magnification lens 21 on the basis of the reference pixel pitch LP0 and the pixel pitch LP-1 corresponding to each of the positions of the first variable magnification lens 21 except for the drive start position. For example, the zoom factor corresponding to each detected pulse count is calculated by dividing the pixel pitch LP-1 corresponding to the detected pulse count by the reference pixel pitch LP0. With this operation, the zoom factor corresponding to each detected pulse count for the first variable magnification lens 21 is obtained. The zoom factors are expressed as a piece I1 of zoom factor information. Portion (a) of FIG. 7 shows an example of the piece I1 of zoom factor information.

The CPU 40 performs similar processing for the second image pickup section 3b. The CPU 40 calculates a zoom factor (e.g., LP-2/LP0) corresponding to the detected pulse count at each position from a drive start position of the second variable magnification lens 31 to a drive end position. The zoom factors are expressed as a piece I2 of zoom factor information. Portion (b) of FIG. 7 shows an example of the piece I2 of zoom factor information. The pieces I1 and I2 of zoom factor information are stored in the RAM 90.

In S3, the CPU 40 creates a pulse position adjustment table where a zoom factor of the first variable magnification lens 21 in the piece I1 of zoom magnification information which coincides with a predefined zoom factor for each zoom step and a zoom factor of the second variable magnification lens 31 in the piece I2 of zoom magnification information which is closest to the zoom factor of the first variable magnification lens 21 are associated with each other.

For example, assume that zoom step data defining correspondences between the zoom steps Z1 to Z4 and corresponding zoom factors for the first variable magnification lens 21, such as Z1 (the WIDE end) and 1.0000, Z2 and 2.0000, Z3 and 3.0000, and Z4 (the TELE end) and 3.9980, are stored in advance in the EEPROM 50. In this case, a zoom factor of 0.9980 of the second variable magnification lens 31 which is closest to a zoom factor of 1.0000 of the first variable magnification lens 21 for Z1 is associated with the zoom factor of 1.0000. Similar association is performed for Z2, Z3, and Z4. For example, a zoom factor of 4.0056 of the second variable magnification lens 31 which is closest to a zoom factor of 3.9980 of the first variable magnification lens 21 for Z4 is associated with the zoom factor of 3.9980.

As a result of the association, correspondences between detected pulse counts for the first variable magnification lens 21 and detected pulse counts for the second variable magnification lens 31 for the respective zoom steps are determined. The correspondences are stored as the pulse position adjustment table in the EEPROM 50.

Figure 8:
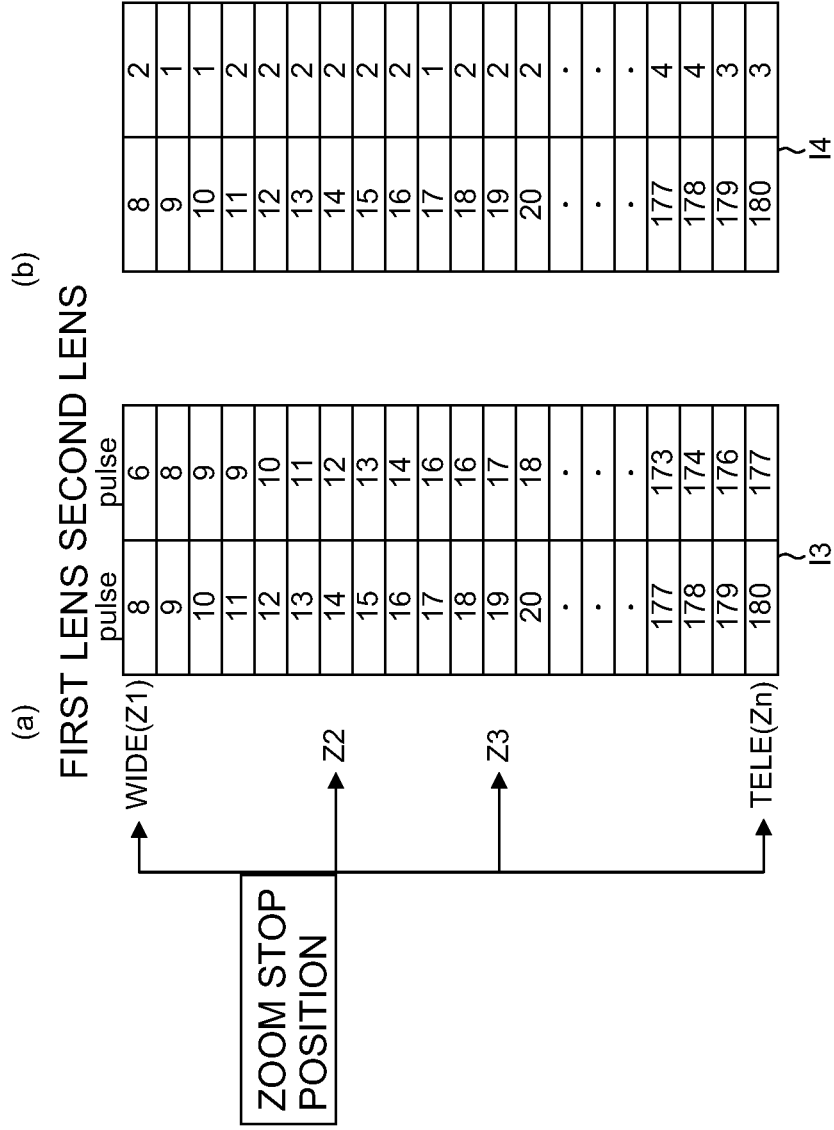
FIG. 8 is a chart showing an example of a pulse position adjustment table.

Portion (a) of FIG. 8 shows an example (I3) of the pulse position adjustment table. The table I3 is used to adjust stop pulse positions of the first variable magnification lens 21 and the second variable magnification lens 31 corresponding to a zoom step which is set through the operation section 10 at the time of imaging.

Portion (b) of FIG. 8 shows another example (I4) of the pulse position adjustment table. The pulse position adjustment table I4 is different from the pulse position adjustment table I3 in FIG. 8, in which total pulse counts starting at "0" (the home positions) are associated with each other. In the pulse position adjustment table I4, a pulse count for the first variable magnification lens 21 and a difference between the pulse count for the first variable magnification lens 21 and a pulse count for the second variable magnification lens 31 correspond to a single zoom step. The pulse position adjustment table I4 is created in the manner below. The CPU 40 subtracts the pulse count for the second variable magnification lens 31 corresponding to each magnification in the pulse position adjustment table I3 from the pulse count for the first variable magnification lens 21, thereby obtaining a difference. The CPU 40 associates the pulse count for the first variable magnification lens 21 corresponding to each magnification in the pulse position adjustment table I3 with the difference obtained for the magnification, thereby creating the pulse position adjustment table I4. Note that a difference may be obtained by subtracting the pulse count for the first variable magnification lens 21 corresponding to each magnification in the pulse position adjustment table I3 from the pulse count for the second variable magnification lens 31. This is because both the methods are essentially the same except for the sign of a difference.

Figure 9:
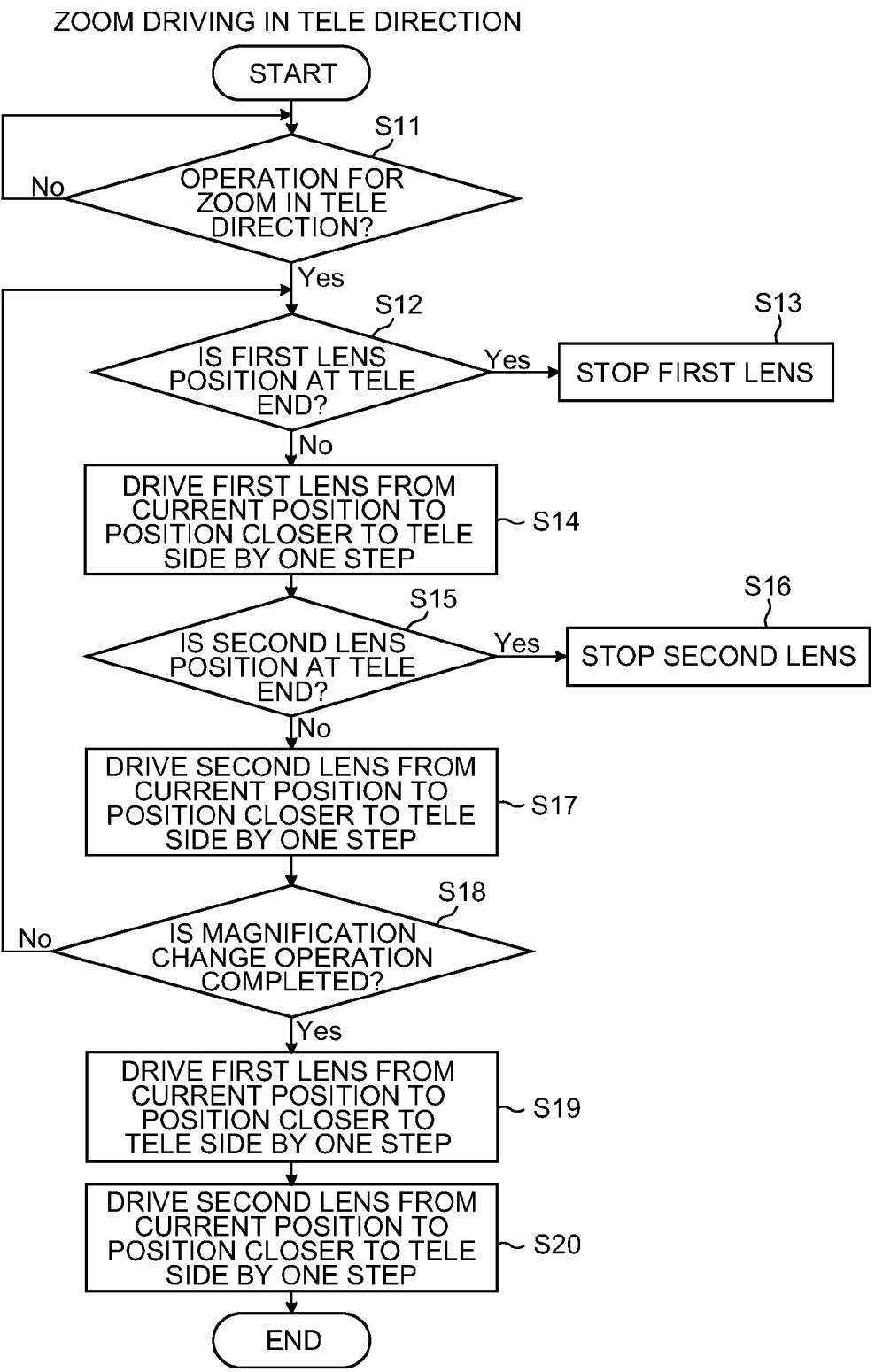
FIG. 9 is a flow chart of a pulse position adjustment process when a first variable magnification lens and a second variable magnification lens move in the TELE direction.

FIG. 9 shows a flow chart of a pulse position adjustment process when the first variable magnification lens 21 and the second variable magnification lens 31 move in the TELE direction. FIG. 10 shows a flow chart of a pulse position adjustment process when the first variable magnification lens 21 and the second variable magnification lens 31 move in the WIDE direction. Implementation of the process is controlled by the CPU 40. A program for causing the CPU 40 to perform the processes is stored in the program storage section 51.

Referring to FIG. 9, if the zoom buttons 7 are operated to select the TELE direction in S11 (Yes in S11), the flow advances to S12 to determine whether pulses, the number of which corresponds to the TELE end (Zn), are detected by the PC 61. If Yes, the flow advances to S13. Otherwise, the flow advances to S14.

In S13, the CPU 40 stops driving the lens motor 24.

In S14, the CPU 40 moves the first variable magnification lens 21 from a current position (Zk) to a position (Zk+1) closer to the TELE side by one step. That is, the CPU 40 identifies a pulse count for the first variable magnification lens 21 corresponding to the position (Zk+1) closer to the TELE side whose zoom step is next to that of the current position (Zk) from the pulse position adjustment table I3 or I4 and sets the identified pulse count as a first target stop position. The CPU 40 drives the lens motor 24 such that the number of pulses detected by the PC 61 coincides with the first target stop position. Assume that k ranges from 1 to n−1.

In S15, the CPU 40 determines whether pulses, the number of which corresponds to the TELE end (Zn), are detected by the PC 71. If Yes, the flow advances to S16. Otherwise, the flow advances to S17.

In S16, the CPU 40 stops driving the lens motor 24.

In S17, the CPU 40 moves the second variable magnification lens 31 from a current position (Zk) to a position (Zk+1) closer to the TELE side by one step. That is, the CPU 40 identifies a pulse count for the second variable magnification lens 31 corresponding to the position (Zk+1) closer to the TELE side by one step than the current position (Zk) in the pulse position adjustment table 13 or 14 and sets the identified pulse count as a second target stop position. The CPU 40 drives the lens motor 34 such that the number of pulses detected by the PC 71 coincides with the second target stop position. Note that, when the table I4 is used, the CPU 40 sets, as the second target stop position, a pulse count obtained by subtracting a difference corresponding to the first target stop position from the first target stop position in the table I4.

In S18, the CPU 40 determines whether input operation using the zoom buttons 7 is completed. If Yes, the flow advances to S19. Otherwise, the flow returns to S12.

In S19, the CPU 40 moves the first variable magnification lens 21 from the current position (Zk+1) to a position (Zk+2) closer to the TELE side by one step. Note that, if the current position is the TELE end, the CPU 40 stops driving the lens motor 24.

In S20, the CPU 40 moves the second variable magnification lens 31 from the current position (Zk+1) to a position (Zk+2) closer to the TELE side by one step. Note that, if the current position is the TELE end, the CPU 40 stops driving the lens motor 34.

Referring to FIG. 10, if the zoom buttons 7 are operated to select the WIDE direction in S31 (Yes in S31), the flow advances to S32 to determine whether pulses, the number of which corresponds to the WIDE end (Z1), are detected by the PC 61. If Yes, the flow advances to S33. Otherwise, the flow advances to S34.

In S33, the CPU 40 stops driving the lens motor 24.

In S34, the CPU 40 moves the first variable magnification lens 21 from a current position (Zj) to a position (Zj−1) closer to the WIDE side by one step. That is, the CPU 40 identifies a pulse count for the first variable magnification lens 21 corresponding to the position (Zj−1) whose zoom step is previous to that of the current position (Zj) from the pulse position adjustment table 13 and sets the identified pulse count as a first target stop position. The CPU 40 drives the lens motor 24 such that the number of pulses detected by the PC 61 coincides with the first target stop position. Assume that j ranges from 2 to n.

In S35, the CPU 40 determines whether pulses, the number of which corresponds to the WIDE end (Z1), are detected by the PC 71. If Yes, the flow advances to S36. Otherwise, the flow advances to S37.

In S36, the CPU 40 stops driving the lens motor 24.

In S37, the CPU 40 moves the second variable magnification lens 31 from a current position (Zj) to a position (Zj−1) closer to the WIDE side by one step. That is, the CPU 40 identifies a pulse count for the second variable magnification lens 31 corresponding to the position (Zj−1) whose zoom step is previous to that of the current position (Zj) from the pulse position adjustment table 13 and sets the identified pulse count as a second target stop position. The CPU 40 drives the lens motor 34 such that the number of pulses detected by the PC 71 coincides with the second target stop position.

In S38, the CPU 40 determines whether input operation using the zoom buttons 7 is completed. If Yes, the flow advances to S39. Otherwise, the flow returns to S32.

In S39, the CPU 40 moves the first variable magnification lens 21 from the current position (Zj−1) to a position (Zj−2) closer to the WIDE side by one step. Note that, if the current position is the WIDE end (Z1), the CPU 40 stops driving the lens motor 24.

In S40, the CPU 40 moves the second variable magnification lens 31 from the current position (Zj−1) to a position (Zj−2) closer to the WIDE side by one step. Note that, if the current position is the WIDE end (Z1), the CPU 40 stops driving the lens motor 34.

As described above, a pulse count corresponding to a desired zoom step is identified from the table I3 or I4, and the first variable magnification lens 21 and the second variable magnification lens 31 are driven until pulses, the number of which is equal to the pulse count, are detected. This allows both the optical systems to have almost the same magnifications without losing effective pixels.

Second Embodiment

Lens motors 24 and 34 may each comprise a stepping motor instead of a DC motor. In this case, rotary encoders and pulse counters are unnecessary. In this situation, detected pulse counts in the pulse position adjustment table can be regarded as the numbers of drive pulses to the lens motors 24 and 34.

What is claimed is:

1. An image pickup apparatus comprising:
an image pickup section that photoelectrically converts, by an image pickup element, subject images formed through a plurality of image pickup optical systems including a first optical system and a second optical system and outputs a plurality of images corresponding to the image pickup optical systems;
a first lens drive section that drives a first zoom lens included in the first optical system;
a second lens drive section that drives a second zoom lens included in the second optical system;
a control section that controls stepwise driving of the first lens drive section and the second lens drive section;
a first counter that counts an amount of stepwise feed of the first zoom lens by the first lens drive section with respect to a predetermined reference position as a start point in accordance with control by the control section;
a second counter that counts an amount of stepwise feed of the second zoom lens by the second lens drive section with respect to a predetermined reference position as a start point in accordance with control by the control section;
a calculation section that calculates a magnification of the first zoom lens corresponding to the amount of stepwise feed counted by the first counter and a magnification of the second zoom lens corresponding to the amount of stepwise feed counted by the second counter; and
a zoom correction information creation section that creates zoom correction information in which the amount of stepwise feed of the first zoom lens and the amount of stepwise feed of the second zoom lens corresponding to one of a plurality of magnifications of the first zoom lens and one of a plurality of magnifications of the second zoom lens close to each other are associated and records the zoom correction information on a predetermined storage medium, and
further comprising a designation section which designates a zoom factor, wherein
the control section identifies a first amount of feed which is the amount of stepwise feed of the first zoom lens and a second amount of feed which is the amount of stepwise feed of the second zoom lens corresponding to the zoom factor designated by the designation section from the zoom correction information and controls the first lens drive section to drive the first zoom lens by the first amount of feed and the second lens drive section to drive the second zoom lens by the second amount of feed, and wherein the zoom correction information creation section calculates a difference between the amount of stepwise feed of the first zoom lens and the amount of stepwise feed of the second zoom lens corresponding to each magnification in the zoom correction information and creates zoom correction information in which the amount of stepwise feed of the first zoom lens corresponding to each magnification and the difference are associated, and the control section identifies the first amount of feed as the amount of stepwise feed of the first zoom lens and the difference corresponding to the zoom factor designated by the designation section from the zoom correction information and controls the first lens drive section to drive the first zoom lens by the first amount of feed and the second lens drive section to drive the second zoom lens by an amount in which the difference is subtracted from the first amount of feed.

2. The image pickup apparatus according to claim 1, wherein the first lens drive section and the second lens drive section each comprise a DC motor, the apparatus further comprises a first encoder which outputs a pulse corresponding to an amount of rotation of the DC motor of the first lens drive section and a second encoder which outputs a pulse corresponding to an amount of rotation of the DC motor of the second lens drive section, the first counter counts, as the amount of feed, the number of pulses outputted by the first encoder in response to stepwise driving of the first zoom lens by the first lens drive section, and the second counter counts, as the amount of feed, the number of pulses outputted by the second encoder in response to stepwise driving of the second zoom lens by the second lens drive section.

3. The image pickup apparatus according to claim 2, wherein the control section controls the image pickup section to output a first image corresponding to the first optical system and a second image corresponding to the second optical system which are subject images of a predetermined line segment chart each time the control section controls stepwise driving of the first lens drive section and the second lens drive section, and the calculation section calculates a magnification of the first zoom lens on the basis of a first length which is a pixel pitch corresponding to a length of the predetermined line segment chart and a reference pitch which is a pixel pitch corresponding to a length of the predetermined line segment chart when the first zoom lens is located at a predetermined 1× magnification position, from the first image outputted from the image pickup section, and calculates a magnification of the second zoom lens on the basis of a second length which is a pixel pitch corresponding to a length of the predetermined line segment chart and the reference pitch, from the second image.

4. The image pickup apparatus according to claim 1, wherein the first lens drive section and the second lens drive section each comprise a stepping motor, the first counter counts, as the amount of feed, the number of drive pulses from the control section to the first lens drive section corresponding to stepwise driving of the first zoom lens by the first lens drive section, and the second counter counts, as the amount of feed, the number of drive pulses from the control section to the second lens drive section corresponding to stepwise driving of the second zoom lens by the second lens drive section.

5. The image pickup apparatus according to claim 4, wherein the control section controls the image pickup section to output a first image corresponding to the first optical system and a second image corresponding to the second optical system which are subject images of a predetermined line segment chart each time the control section controls stepwise driving of the first lens drive section and the second lens drive section, and the calculation section calculates a magnification of the first zoom lens on the basis of a first length which is a pixel pitch corresponding to a length of the predetermined line segment chart and a reference pitch which is a pixel pitch corresponding to a length of the predetermined line segment chart when the first zoom lens is located at a predetermined 1× magnification position, from the first image outputted from the image pickup section, and calculates a magnification of the second zoom lens on the basis of a second length which is a pixel pitch corresponding to a length of the predetermined line segment chart and the reference pitch, from the second image.

6. An image pickup apparatus comprising:

an image pickup section that photoelectrically converts, by an image pickup element, subject images formed through a plurality of image pickup optical systems including a first optical system and a second optical system and outputs a plurality of images corresponding to the image pickup optical systems;

a first lens drive section that drives a first zoom lens included in the first optical system;

a second lens drive section that drives a second zoom lens included in the second optical system;

a control section that controls stepwise driving of the first lens drive section and the second lens drive section;

a first counter that counts an amount of stepwise feed of the first zoom lens by the first lens drive section with respect to a predetermined reference position as a start point in accordance with control by the control section;

a second counter that counts an amount of stepwise feed of the second zoom lens by the second lens drive section with respect to a predetermined reference position as a start point in accordance with control by the control section;

a calculation section that calculates a magnification of the first zoom lens corresponding to the amount of stepwise feed counted by the first counter and a magnification of the second zoom lens corresponding to the amount of stepwise feed counted by the second counter; and a zoom correction information creation section that creates zoom correction information in which the amount of stepwise feed of the first zoom lens and the amount of stepwise feed of the second zoom lens corresponding to one of a plurality of magnifications of the first zoom lens and one of a plurality of magnifications of the second zoom lens close to each other are associated and records the zoom correction information on a predetermined storage medium, wherein the control section controls the image pickup section to output a first image corresponding to the first optical system and a second image corresponding to the second optical system which are subject images of a predetermined line segment chart each time the control section controls stepwise driving of the first lens drive section and the second lens drive section, and the calculation section calculates a magnification of the first zoom lens on the basis of a first length which is a pixel pitch corresponding to a length of the predetermined line segment chart and a reference pitch which is a pixel pitch corresponding to a length of the predetermined line segment chart when the first zoom lens is located at a predetermined 1× magnification position, from the first image outputted from the image pickup section, and calculates a magnification of the second zoom lens on the basis of a second length which is a pixel pitch corresponding to a length of the predetermined line segment chart and the reference pitch, from the second image.

7. A zoom correction information creation method for an image pickup apparatus having an image pickup section that photoelectrically converts, by an image pickup element, subject images formed through a plurality of image pickup optical systems including a first optical system and a second optical system and outputs a plurality of images corresponding to the image pickup optical systems, a first lens drive section that drives a first zoom lens included in the first optical system, a second lens drive section that drives a second zoom lens included in the second optical system, and a control section that controls stepwise driving of the first lens drive section and the second lens drive section, the method comprising the steps of:

counting an amount of stepwise feed of the first zoom lens by the first lens drive section with respect to a predetermined reference position as a start point in accordance with control by the control section;

counting an amount of stepwise feed of the second zoom lens by the second lens drive section with respect to a predetermined reference position as a start point in accordance with control by the control section;

calculating a magnification of the first zoom lens corresponding to the counted amount of stepwise feed of the first zoom lens and a magnification of the second zoom lens corresponding to the counted amount of stepwise feed of the second zoom lens; and creating zoom correction information in which the amount of stepwise feed of the first zoom lens and the amount of stepwise feed of the second zoom lens corresponding to one of a plurality of the magnification of the first zoom lens and one of a plurality of the magnification of the second zoom lens close to each other are associated and recording the zoom correction information on a predetermined storage medium, and further comprising designating a zoom factor, wherein the control section identifies a first amount of feed which is the amount of stepwise feed of the first zoom lens and a second amount of feed which is the amount of stepwise feed of the second zoom lens corresponding to the zoom factor designated by the designating step from the zoom correction information and controls the first lens drive section to drive the first zoom lens by the first amount of feed and the second lens drive section to drive the second zoom lens by the second amount of feed, and wherein the zoom correction information comprises a difference between the amount of stepwise feed of the first zoom lens and the amount of stepwise feed of the second zoom lens corresponding to each magnification in the zoom correction information and creates zoom correction information in which the amount of stepwise feed of the first zoom lens corresponding to each magnification and the difference are associated, and the control section identifies the first amount of feed as the amount of stepwise feed of the first zoom lens and the difference corresponding to the zoom factor designated by the designating step from the zoom correction information and controls the first lens drive section to drive the first zoom lens by the first amount of feed and the second lens drive section to drive the second zoom lens by an amount in which the difference is subtracted from the first amount of feed.

8. A non-transitory computer-readable medium storing a zoom correction information creation program for causing the image pickup apparatus to perform a zoom correction information creation method according to claim 7.

9. An image pickup method comprising:

an image pickup step of photoelectrically converting, by an image pickup element, subject images formed through a plurality of image pickup optical systems including a first optical system and a second optical system and outputting a plurality of images corresponding to the image pickup optical systems;

driving a first zoom lens included in the first optical system, using a first lens drive section controlled in a stepwise manner;

driving a second zoom lens included in the second optical system, using a second lens drive section controlled in a stepwise manner;

first counting step of counting an amount of stepwise feed of the first zoom lens with respect to a predetermined reference position as a start point in accordance with a stepwise control section;

second counting step of counting an amount of stepwise feed of the second zoom lens with respect to a predetermined reference position as a start point in accordance with the stepwise control section;

calculating a magnification of the first zoom lens corresponding to the amount of stepwise feed counted by the first counting and a magnification of the second zoom lens corresponding to the amount of stepwise feed counted by the second counting; and creating zoom correction information in which the amount of stepwise feed of the first zoom lens and the amount of stepwise feed of the second zoom lens corresponding to one of a plurality of magnifications of the first zoom lens and one of a plurality of magnifications of the second zoom lens close to each other are associated and recording the zoom correction information on a predetermined storage medium, wherein the control section controls the image pickup element to output a first image corresponding to the first optical system and a second image corresponding to the second optical system which are subject images of a predetermined line segment chart each time the control section controls stepwise driving of the first lens drive section and the second lens drive section, and the method further comprising calculating a magnification of the first zoom lens on the basis of a first length which is a pixel pitch corresponding to a length of the predetermined line segment chart and a reference pitch which is a pixel pitch corresponding to a length of the predetermined line segment chart when the first zoom lens is located at a predetermined 1× magnification position, from the first image outputted from the image pickup element, and calculating a magnification of the second zoom lens on the basis of a second length which is a pixel pitch corresponding to a length of the predetermined line segment chart and the reference pitch, from the second image.

10. A non-transitory computer readable medium encoded with a program causing one or more processors to perform steps comprising:

an image pickup step of photoelectrically converting, by an image pickup element, subject images formed through a plurality of image pickup optical systems including a first optical system and a second optical system and outputting a plurality of images corresponding to the image pickup optical systems;

driving a first zoom lens included in the first optical system, using a first lens drive section controlled in a stepwise manner;

driving a second zoom lens included in the second optical system, using a second lens drive section controlled in a stepwise manner;

first counting step of counting an amount of stepwise feed of the first zoom lens with respect to a predetermined reference position as a start point in accordance with a stepwise control section;

second counting step of counting an amount of stepwise feed of the second zoom lens with respect to a predetermined reference position as a start point in accordance with the stepwise control section;

calculating a magnification of the first zoom lens corresponding to the amount of stepwise feed counted by the first counting and a magnification of the second zoom lens corresponding to the amount of stepwise feed counted by the second counting; and creating zoom correction information in which the amount of stepwise feed of the first zoom lens and the amount of stepwise feed of the second zoom lens corresponding to one of a plurality of magnifications of the first zoom lens and one of a plurality of magnifications of the second zoom lens close to each other are associated and recording the zoom correction information on a predetermined storage medium, wherein the control section controls the image pickup element to output a first image corresponding to the first optical system and a second image corresponding to the second optical system which are subject images of a predetermined line segment chart each time the control section controls stepwise driving of the first lens drive section and the second lens drive section, and the method further comprising calculating a magnification of the first zoom lens on the basis of a first length which is a pixel pitch corresponding to a length of the predetermined line segment chart and a reference pitch which is a pixel pitch corresponding to a length of the predetermined line segment chart when the first zoom lens is located at a predetermined 1× magnification position, from the first image outputted from the image pickup element, and calculating a magnification of the second zoom lens on the basis of a second length which is a pixel pitch corresponding to a length of the predetermined line segment chart and the reference pitch, from the second image.

* * * * *